Nov. 20, 1962   W. W. WASHNOCK ETAL   3,064,685
DIAPHRAGM HOUSING
Original Filed Feb. 9, 1956   2 Sheets-Sheet 1
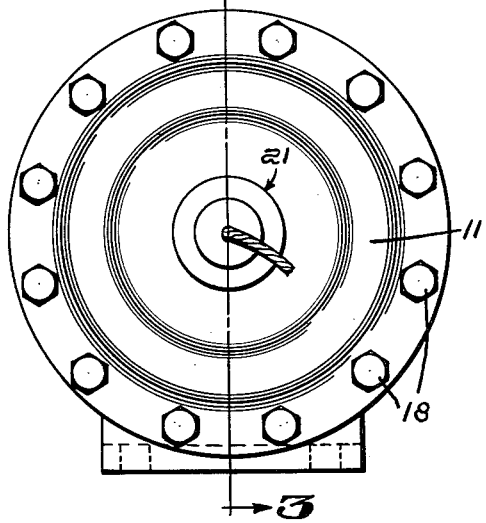
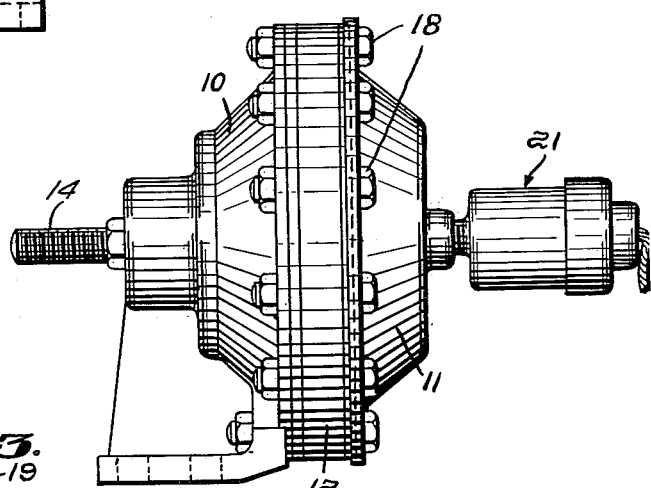
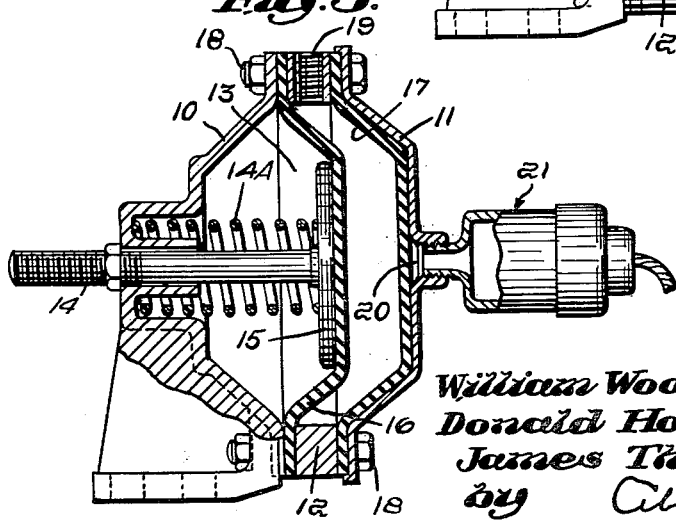
Inventors:
William Woodrow Washnock,
Donald Howard Washnock,
James Thomas Washnock,
by
Attorney Inventors:
William Woodrow Washnock,
Donald Howard Washnock,
James Thomas Washnock,
by Albert Spier,
Attorney

United States Patent Office 3,064,685
Patented Nov. 20, 1962

3,064,685
DIAPHRAGM HOUSING
William Woodrow Washnock, 1543 Latrobe Ave., Latrobe, Pa., and Donald Howard Washnock and James Thomas Washnock, both P.O. Box 38, Whitney, Pa.
Continuation of application Ser. No. 564,439, Feb. 9, 1956. This application Feb. 15, 1960, Ser. No. 8,604
3 Claims. (Cl. 137—787)

This invention relates to new and improved air brake systems and more specifically to that part of the brake system comprising the diaphragm housing and the diaphragm. Such a brake system is particularly adapted to, but not limited to, wheeled vehicles having air brakes and the present application is a continuation of our co-pending application, Serial No. 564,439, filed February 9, 1956, now abandoned.

In conventional air brake systems, pressure operated units are employed, each comprising a housing, a diaphragm mounted therein for movement from an inoperative position to an operative position in response to air under pressure, and an actuator in the form of a piston and driven forwardly relative to the housing as the diaphragm is forced out of its inoperative position. The pistons are typically connected to lever arms on cam shafts which rotate and push the brake shoes against the brake drums when air is admitted to the diaphragm housings. Vehicles with air brakes also carry a container of compressed air and a valve arrangement which can be controlled by the driver of the vehicle to admit air to the diaphragm housings. Occasionally such air brakes fail due to loss of air through ruptured or badly worn diaphragms.

The objective of the present invention is to provide emergency means effective to operate the brakes in the event of failure of the system due to the above cited causes. This objective is attained by providing a housing having a first wall centrally through which an actuator freely extends and a second wall having an inlet port for an emergency supply of fluid under pressure. Two pressure responsive elements are utilized, of which one is in engagement with the actuator and the other has a normal position in which it lies against the second wall and is remote from the first element in any position thereof unless the emergency power source is utilized, thus to cause it to drive the actuator in a brake operating direction. A port in the housing, located between the elements, receives fluid under pressure from the usual source.

In the accompanying drawings, there are shown illustrative embodiments of the invention from which these and other of its objectives, novel features, and advantages will be readily apparent.

In the drawings:

FIG. 1 is an end view of a pressure operated unit in accordance with the invention;

FIG. 2 is a side elevation of the unit shown in FIG. 1;

FIG. 3 is a section taken approximately along the indicated lines 3—3 of FIG. 1;

Figure 4:
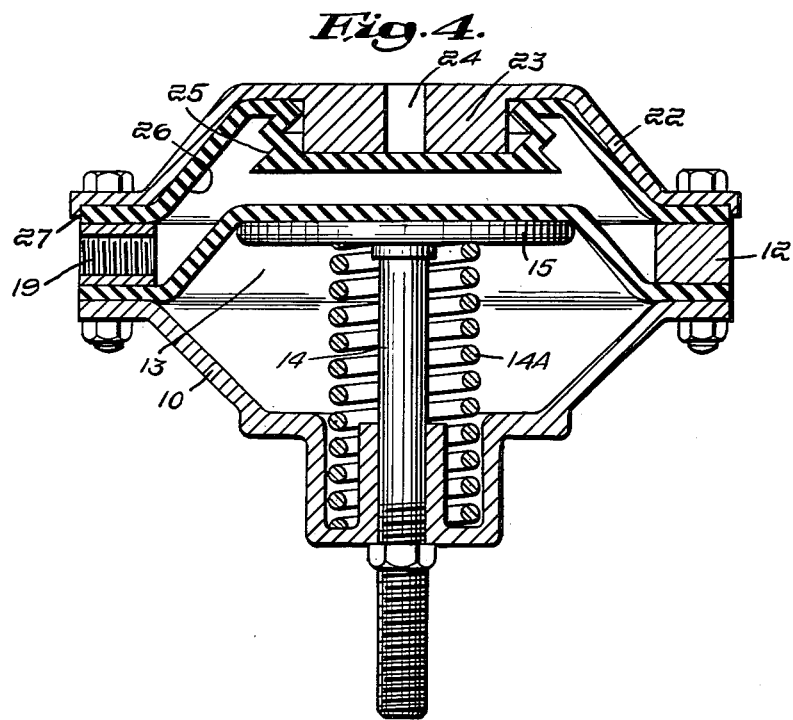
FIG. 4 is a corresponding section illustrating another embodiment of the invention.

In the embodiment of the invention shown in FIGS. 1–3, there is shown a pressure operated unit whose housing consists of first and second walls 10 and 11, respectively, and an intermediate spacer 12 assembled to define a chamber 13.

A piston or actuator 14, of the brake operating system, is under the control of a return spring 14A and extends freely through the first wall 10 into the chamber 13 where it has a head 15 engaged by the central part of an element 16, in the form of a diaphragm. The margins of the element 16 and the margins of an axially spaced second element 17, also in the form of a diaphragm, are clamped by the walls 10 and 11, respectively, against the proximate faces of the spacer 12 as by bolts 18.

The element 16 is shown in its normal position in which the actuator 14 is positioned inoperatively and the spacer 12 has a port 19 to receive air from the usual brake operating source of air under pressure to render the element 16 operative to move the actuator 14 in a brake applying direction.

It will also be noted that the walls 10 and 11 are shown as concave with respect to each other with the wall 11 and the elements 16 and 17 being of substantially the same size and shape. The element 17 has a normal inoperative position in which it is disposed approximately against the wall 11 thus to be backed thereby so that when air is admitted into the chamber 13 between the elements 16 and 17, the element 17 is not subjected to wear producing movements or stresses.

Fluid under pressure may be introduced into the chamber 13 via the port 20 in the second wall 11 thus to force the element 17 into operative position in which it engages the element 16 and forces it and the actuator 14 to effect the application of the brakes.

The diaphragm element 17 may thus be, and preferably is, reserved for use only in the event of failure of the brakes due to the loss of air or the failure of the diaphragm element 16 and maximum safety is assured when a source of brake operating pressure is available for the pressure operated units other than that connected to them via their ports 19. An emergency source of power in communication with the port 20 is indicated at 21. Such a source may be a cartridge or a container of compressed gas, both as described in our now abandoned application, Serial No. 548,117, filed November 21, 1955, It is, of course, not necessary that the elements be diaphragms, as other pressure responsive devices may also be used. For example, there is shown in FIG. 4, a second wall 22 having a thickened central section or boss 23 through which there extends a port 24 for the fluid under pressure from the emergency source. The central section 23 is dimensioned to enter the bellows portion 25 of the generally indicated pressure operated element 26 whose marginal portions 27 are to be clamped between the margins of the wall 22 and the spacer 12.

Figure 5:
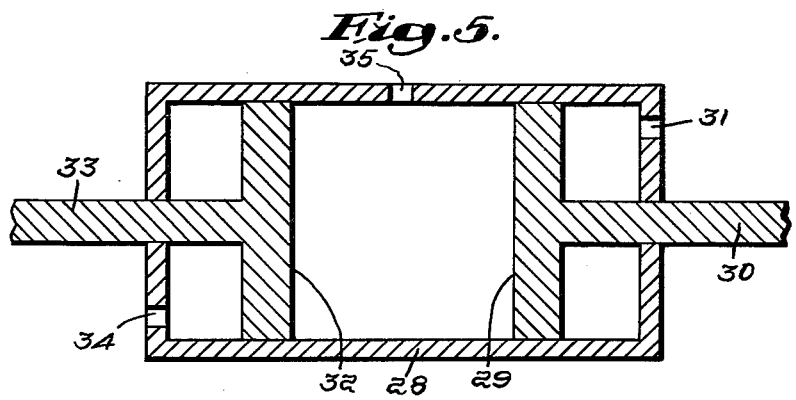
FIG. 5 is a similar view of another embodiment of the invention.

In FIG. 5, there is shown a cylinder 28, in accordance with the invention, adapted for train air brake systems and the like. In the cylinder 28, the element 29 is the head of the piston 30 extending through one cylinder end wall which is vented as at 31 and also there is another element 32 which is the head of the piston 33 extending through the other cylinder end wall which has an inlet port 34 for the fluid under pressure from the emergency source. Between the piston heads, there is an inlet port 35 for effecting communication corresponding to the inlet port 19.

From the foregoing, it will be apparent that the invention is well adapted to meet a wide range of requirements and ensures safety in the event of brake failure from a variety of causes.

We claim:

1. A pressure operated unit for actuating vehicle brakes and the like, said unit comprising a housing including a first wall having a centrally disposed opening, an actuator extending freely through said opening and movable axially outwardly from an inner inoperative position, a second wall having an inlet port for an emergency source of fluid under pressure, first and second fluid pressure operated elements axially spaced relative to each other within said housing and movable relative thereto and to each other from first positions towards said first wall, said actuator being movable with said first element towards said first wall, said second element having a normal position seated against said second wall and out of contact with said first element and an operative position in which said second element contacts said first element and effects movement of said first element and said actuator without contacting said actuator towards said first wall upon failure of the first pressure operated element, and said housing having a port for admitting fluid under pressure between said elements.

2. A pressure operated unit for actuating vehicle brakes and the like, said unit comprising a housing including a first wall having a centrally disposed opening, an actuator extending freely through said opening and movable axially outwardly from an inner inoperative position, a second wall having an inlet port for an emergency source of fluid under pressure, a container for said emergency source having an outlet attached to said inlet port, first and second pressure operated elements axially spaced relative to each other within said housing and movable relative thereto and to each other from first positions towards said first wall, said actuator being movable with said first element towards said first wall, said second element having a normal position seated against said second wall and out of contact with said first element and an operative position in which said second element contacts said first element and effects movement of said first element and said actuator without contacting said actuator towards said first wall upon failure of the first pressure operated element, and said housing having a port for admitting fluid under pressure between said elements.

3. A pressure operated unit for actuating vehicle brakes and the like, said unit comprising a housing including a first wall having a centrally disposed opening, an actuator extending freely through said opening and movable axially outwardly from an inner inoperative position, a second wall having an inlet port for an emergency source of fluid under pressure, first and second diaphragms axially spaced relative to said actuator and marginally attached to said housing and movable relative thereto and to each other, the first diaphragm engageable with said actuator to move said actuator from its inoperative position, said second diaphragm having a normal position seated against said second wall and out of contact with said first diaphragm and an operative position in which said second diaphragm contacts said first diaphragm and effects movement of said first diaphragm and said actuator without contacting said actuator towards said first wall upon failure of the first pressure operated diaphragm, said housing having a port for admitting fluid under pressure between said diaphragms.

References Cited in the file of this patent
UNITED STATES PATENTS

| | | |
|---|---|---|
| 2,105,127 | Petroe | Jan. 11, 1938 |
| 2,162,757 | Shaw | June 20, 1939 |
| 2,335,762 | Hunt et al. | Nov. 30, 1943 |
| 2,545,857 | Perkins et al. | Mar. 20, 1951 |
| 2,645,240 | Drake | July 14, 1953 |
| 2,649,169 | Holman | Aug. 18, 1953 |
| 2,770,799 | Horn | Oct. 13, 1956 |
| 2,936,785 | Hastings | May 17, 1960 |